(12) United States Patent
Owen

(10) Patent No.: US 8,542,556 B2
(45) Date of Patent: Sep. 24, 2013

(54) DIRECTIONAL SEISMIC SENSOR ARRAY

(76) Inventor: Thomas E. Owen, Helotes, TX (US)

( * ) Notice: Subject to any disclaimer, the term of this patent is extended or adjusted under 35 U.S.C. 154(b) by 325 days.

(21) Appl. No.: 13/051,275

(22) Filed: Mar. 18, 2011

(65) Prior Publication Data

US 2012/0236687 A1   Sep. 20, 2012

(51) Int. Cl.
*G01V 1/18* (2006.01)
*G01V 1/16* (2006.01)

(52) U.S. Cl.
USPC ............... 367/178; 367/75; 367/58; 181/122; 181/401

(58) Field of Classification Search
USPC ............. 367/58, 75, 178, 188; 181/108, 181/112, 122, 401
See application file for complete search history.

(56) References Cited

U.S. PATENT DOCUMENTS

| | | | |
|---|---|---|---|
| 2,906,363 A * | 9/1959 | Clay, Jr. ........................ 367/58 |
| 3,716,111 A * | 2/1973 | Lavergne ...................... 181/113 |
| 3,858,168 A * | 12/1974 | Barr et al. ...................... 367/43 |
| 4,300,220 A * | 11/1981 | Goff et al. ..................... 367/188 |
| 4,637,001 A * | 1/1987 | Annoot ......................... 367/177 |
| 4,712,641 A * | 12/1987 | Chelminski .................. 181/113 |
| 4,803,669 A * | 2/1989 | Airhart ........................... 367/72 |
| 4,813,029 A * | 3/1989 | Erich et al. .................... 367/188 |
| 5,010,531 A * | 4/1991 | McNeel ......................... 367/188 |
| 5,148,407 A * | 9/1992 | Haldorsen et al. ............... 367/32 |
| 5,166,909 A * | 11/1992 | Cole et al. ...................... 367/189 |
| 5,177,709 A * | 1/1993 | Baziw ............................. 367/38 |
| 5,231,252 A * | 7/1993 | Sansone ......................... 181/122 |
| 5,335,208 A * | 8/1994 | Sansone .......................... 367/49 |
| 5,545,858 A * | 8/1996 | Sansone ......................... 181/122 |
| 5,724,307 A * | 3/1998 | Gaiser ............................. 367/21 |
| 6,119,804 A * | 9/2000 | Owen ............................ 181/113 |
| 6,366,537 B1 * | 4/2002 | Sambuelli et al. ............. 367/178 |
| 6,488,117 B1 * | 12/2002 | Owen ............................ 181/121 |
| 7,079,954 B2 * | 7/2006 | Ghosh ............................ 702/17 |
| 7,443,763 B2 * | 10/2008 | Swanson ......................... 367/16 |
| 7,561,493 B2 * | 7/2009 | Ray et al. ....................... 367/188 |
| 7,668,047 B2 * | 2/2010 | Ray et al. ....................... 367/188 |
| 7,684,284 B1 * | 3/2010 | Al-Jadani ...................... 367/178 |
| 7,986,589 B2 * | 7/2011 | Ray et al. ........................ 367/76 |

* cited by examiner

Primary Examiner — Ian J Lobo
(74) Attorney, Agent, or Firm — Thomas E Sisson, PLLP

(57) ABSTRACT

A vibration sensor system for contacting the surface of a solid medium for detecting horizontally polarized shear waves and compressional waves. At least two contact points interface between a vibration sensor array and the solid medium to provide uninterrupted contact with the medium during detection of dynamic motions in the medium. A single vibration sensor is mounted on at least two adjacent contact points to convert detected dynamic motions to corresponding electrical signals. The single vibration sensor mounted on the two adjacent contact points forms a sub-array. The vibration sensor system has at least two sub-arrays. A conditioning and combining member treats sensor electrical signals from at least two sub-arrays to form a composite output signal for the system.

10 Claims, 13 Drawing Sheets

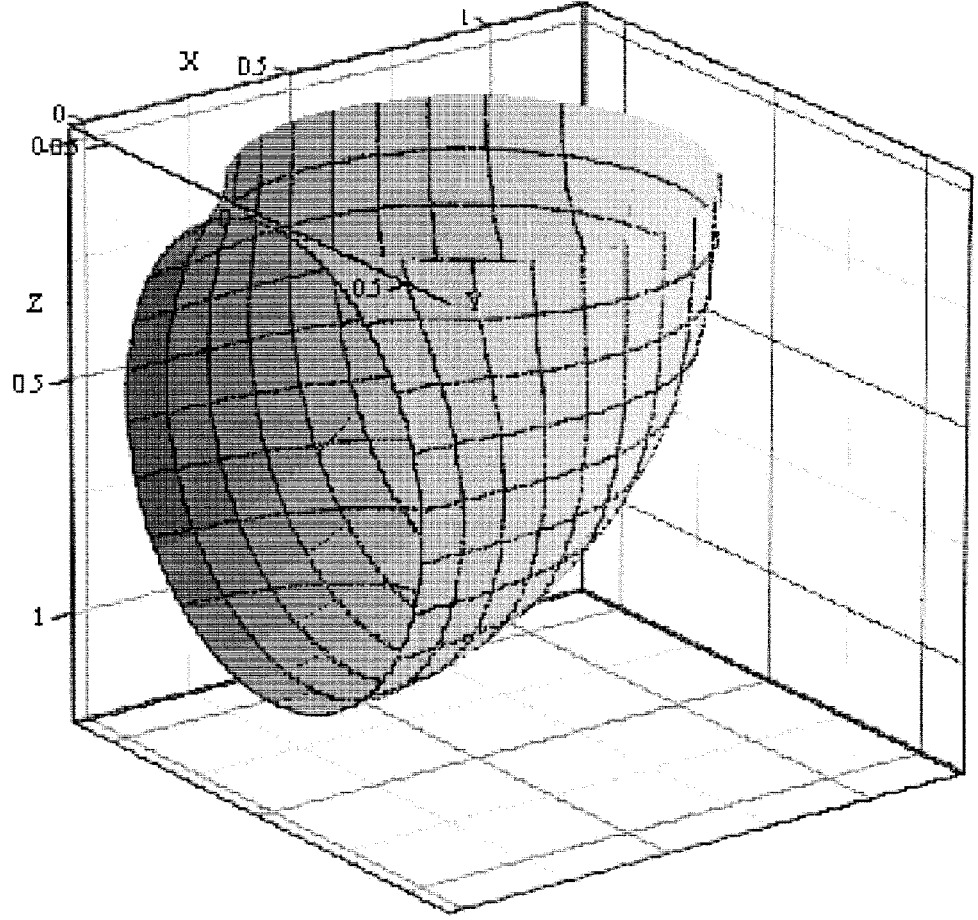
*FIG. 4A*  Single-Point Sensor – All frequencies

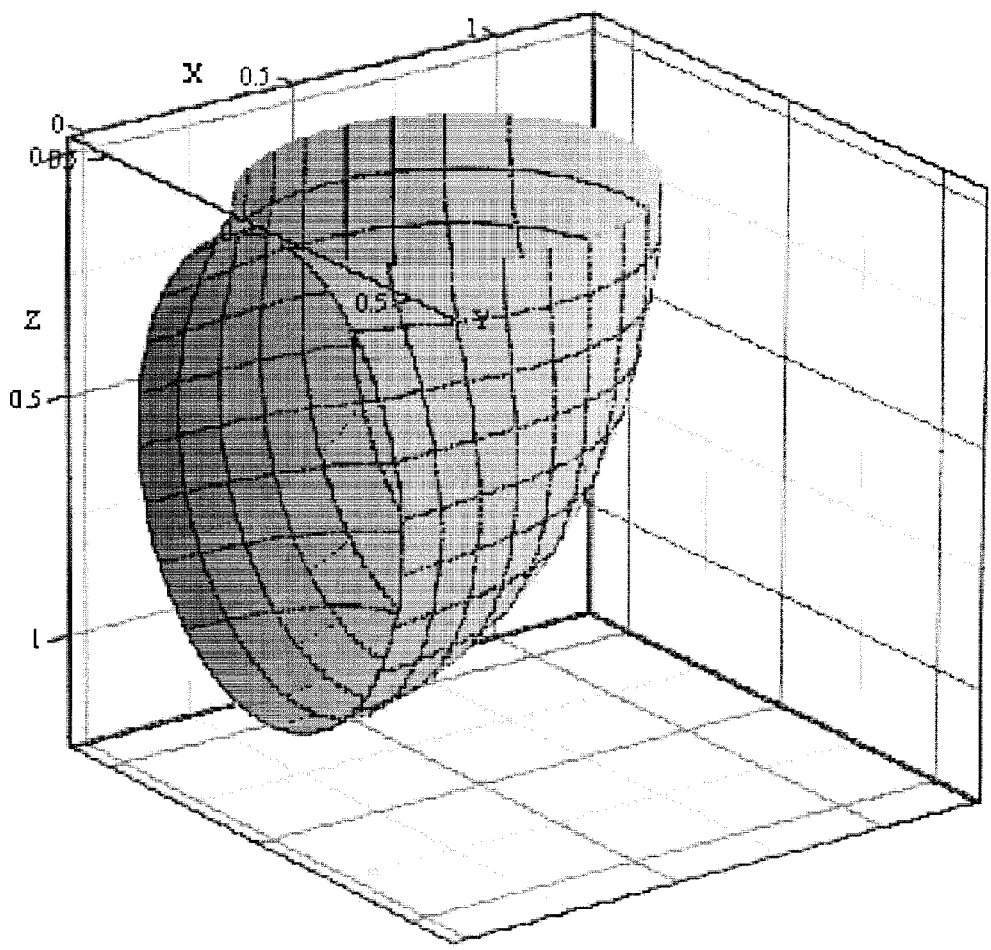
*FIG. 4B-1*    100 Hz

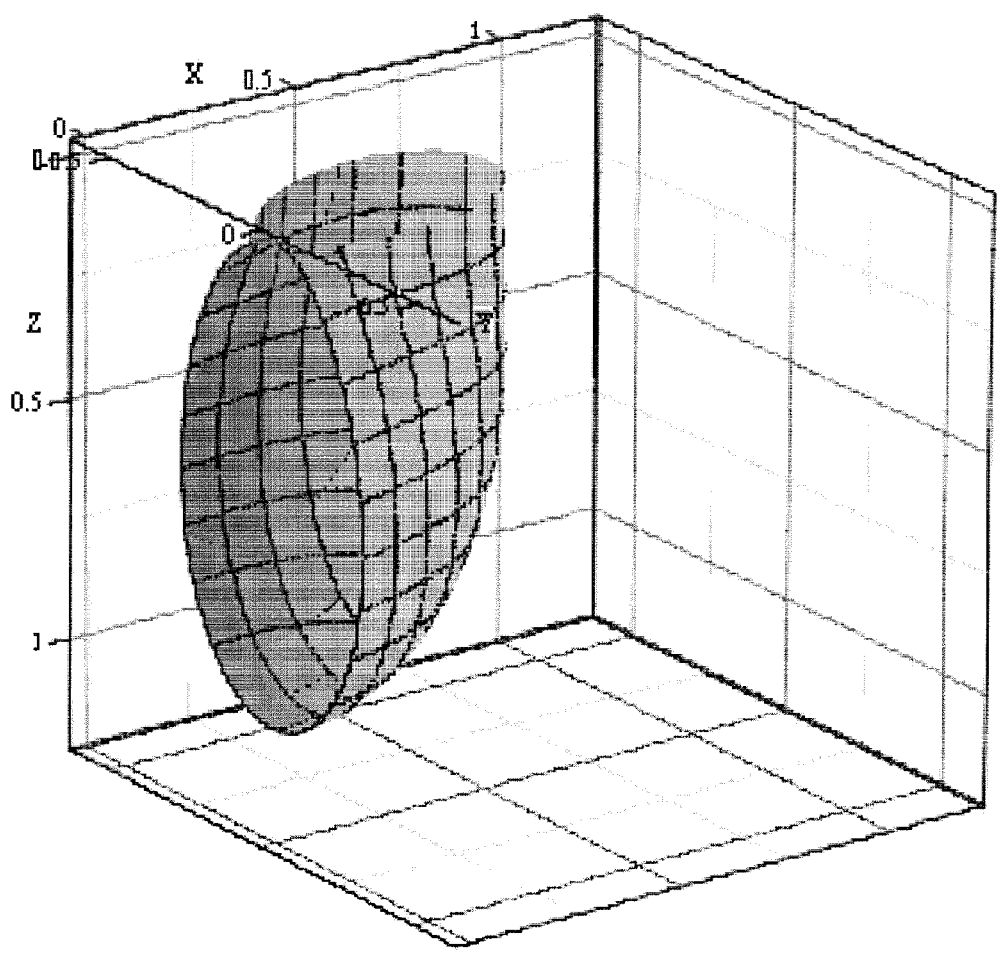
*FIG. 4B-2*  220 Hz

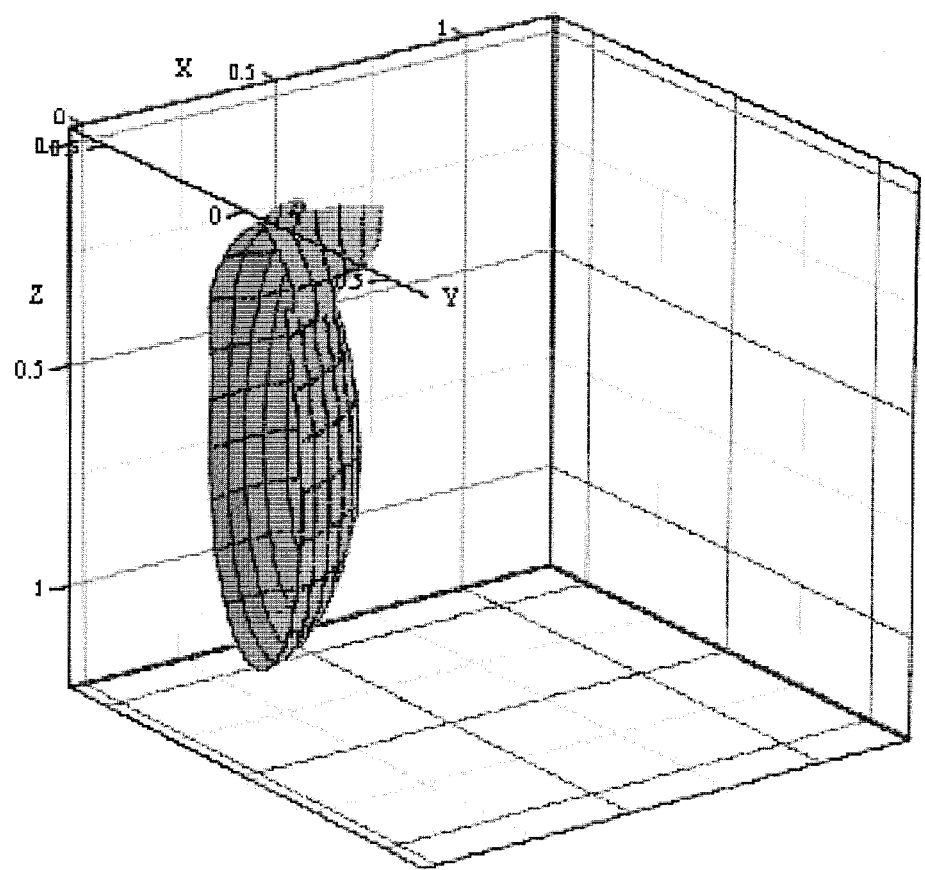
*FIG. 4B-3*  460 Hz

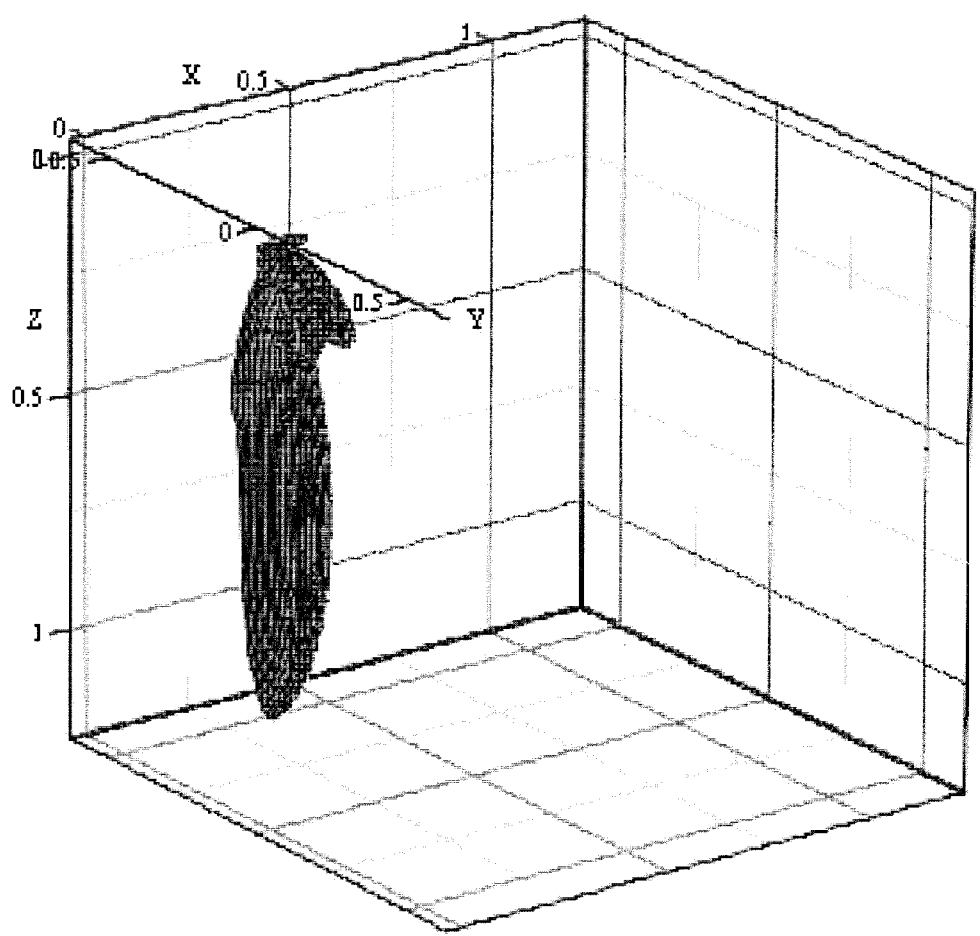
*FIG. 4B-4*  820 Hz

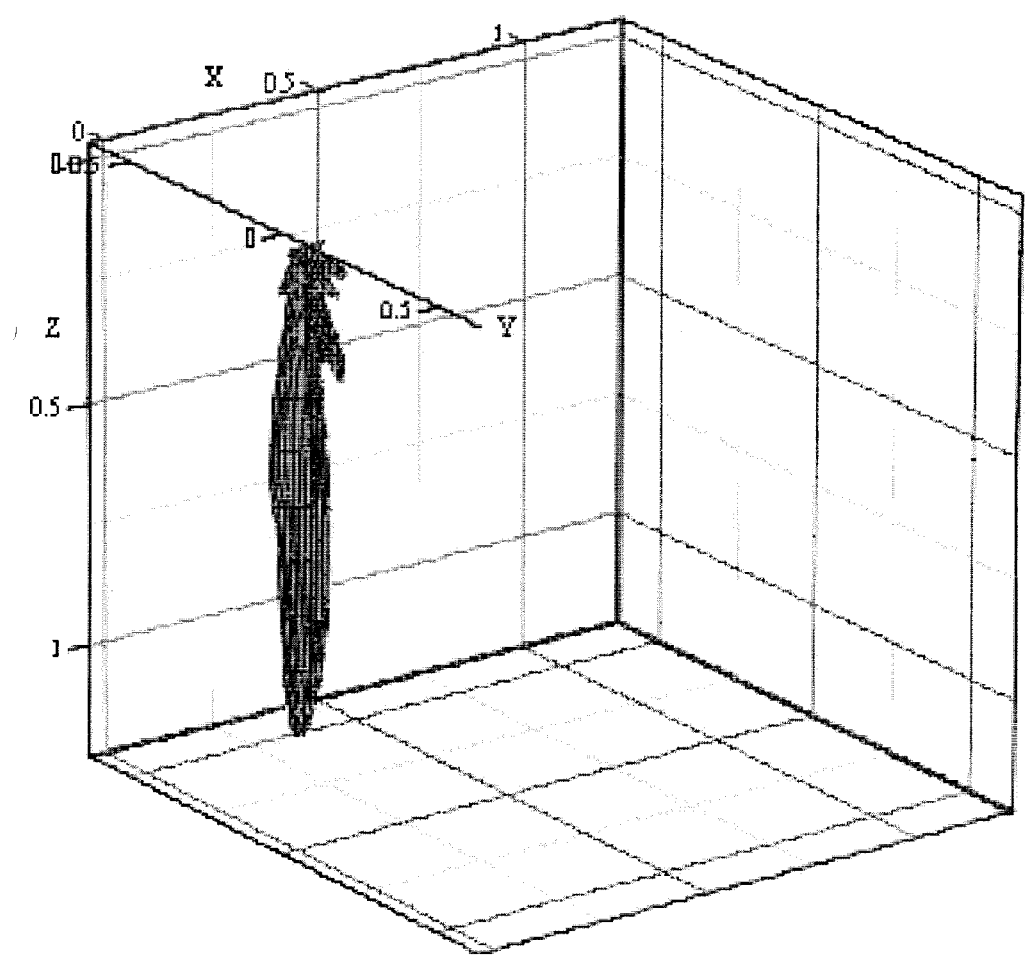
FIG. 4B-5    1540 Hz

DIRECTIONAL SEISMIC SENSOR ARRAY

BACKGROUND OF INVENTION

This invention relates to improvements in seismic sources for use in seismic surveys for detecting, locating, and delineating shallow target objects for engineering and geotechnical purposes.

In particular, the electrodynamic vibrator sources disclosed in U.S. Pat. No. 6,119,804 and in U.S. Pat. No. 6,488,117 have been effective in generating wide bandwidth controlled seismic waves defined as horizontally polarized shear (SH) waves and compressional (P) waves, respectively, at frequencies in the range 30-700 Hz, and higher, by their respective modes of operation and coupling to the ground surface. These sources have been used in combination with conventional geophysical exploration geophone sensors to detect, locate, and delineate abnormal soil conditions surrounding underground sewer pipes; detect and map shallow abandoned coal mines, image shallow soil-bedrock interfaces and paleochannels; and delineate fractures in shallow rock formations. In general, limitations caused by anomalies in the frequency response of conventional seismic geophones have prevented effective application of the vibrator sources at frequencies higher than 700 Hz as a means of detecting smaller underground targets and in resolving smaller details of subsurface target structures.

Conventional seismic field surveys employing relatively large one-dimensional linear or two-dimensional surface area layouts of geophone sensors and the placement of the seismic source at many positions along or within such layouts, while effective for deep geophysical exploration purposes, are technically inappropriate for shallow seismic reflections surveys in near-surface soil formations. The limitations largely relate to the nature of the shallow and localized underground targets of interest, such as pipes, cavities, and foundations, and the fact that conventional seismic data acquisition and analysis is labor intensive and expensive. Therefore, a more appropriate field methodology utilizing compact and semi-mobile equipment deployment and minimum data processing and analysis is needed to make near-surface high-resolution seismic surveys more productive and cost effective.

Attempts to obtain high resolution seismic survey results indicates that sensor devices such as accelerometers appropriately designed for seismic applications could provide improved frequency response above 700 Hz with the potential for uniform high frequency response up to about 2,000 Hz, and higher, consistent with the high-frequency operating capabilities of the above mentioned seismic sources. Additionally, attempts to extend other aspects of conventional seismic exploration techniques to higher frequency operation, such as variations in the placement and layout of the source and sensors on the ground, suggests that changes in the standard field operating techniques could also improve the overall success of shallow high-resolution seismic applications.

In contrast with using a scaled down version of conventional seismic survey methodology using relatively large geophone layouts and multiple source positions to acquire subsurface reflection data, a more compact alternative technique is one in which the vibrator source and a single compact sensor array are closely spaced and step-wise scanned over the survey area as a source-sensor pair. This compact source and sensor assembly is essentially a vertically down-going transmission and a vertically up-going reflection survey system. Therefore, since the field of view of such a system is intentionally restricted to near vertical seismic propagation paths, the source and sensor components can be made directional and primarily responsive to subsurface targets located essentially directly below the source-sensor pair on the surface. The seismic vibrator sources mentioned above are already capable of directional radiation of either SH waves or P waves, as a result of the relatively large area of the ground contact base plate as measured in wavelengths at the operating frequency. In contrast, a single accelerometer sensor operates as a point detector responsive to reflections from a wide field of view. Thus, to have a directional field of view, the sensor component also requires a relative large ground contact area, comparable to that of the vibrator source, to provide a useful companion component in the source-sensor pair.

Conceptually, the desired sensor directivity could be achieved by mounting a single accelerometer sensor on a base plate of approximately the same size as the base plate of the vibrator. However, in this arrangement, the sensor base plate must be rigid and, hence, heavy and properly damped to avoid undesirable spurious mechanical vibration resonance modes. Further, such an arrangement is a relatively limited technical approach which will result in reduced sensitivity to ground vibrations because of its large dynamic inertial mass.

Alternately, a cluster of individual accelerometer sensors arrayed in the size and shape of the aforementioned base plate may be used as a much more effective sensor system. An array of point transducers, operating either as sources or detectors, can serve as a beam-forming radiating or receiving aperture provided that the elements of the array are spaced less than one-half wavelength apart at the highest frequency of interest. Such an array has a number of important advantages when operating as a directional sensor. Such advantages include, but are not limited to:
 a. Elimination of spurious mechanical vibrations associated with plate-type apertures;
 b. An array of independent sensors mounted on a flexible panel capable of conforming with and coupling to an irregular or uneven ground surface;
 c. An array having minimum required weight and bulk;
 d. A multiple-channel array of sensors, in contrast with a single planar base plate, which may be used to implement advanced array operating techniques such as directional beam steering and focused response at selectable reflection depths;
 e. Additive operation of independent sensor elements to enhance the response to coherent reflection signals while suppressing incoherent noise;
 f. Sufficiently high directivity in typical near-surface soil media to detect high-resolution reflections from small localized targets such as utility distribution pipes and conduits.

Such advantages, together with novel methods for reducing the required number of active sensor elements needed to implement large directional arrays and novel isolation mounting of the individual sensor elements and sub-arrays may be combined to produce a new and effective directional seismic sensor array as described in further detail below.

The directional seismic sensor system described hereinbelow offers a significant improvement over conventional seismic survey sensor technology for use in near-surface high-resolution seismic reflection imaging applications.

BRIEF DESCRIPTION OF THE DRAWINGS

The following figures illustrate the general configuration of point-element sensor arrays and, further illustrate several embodiments of the directional sensor array configurations disclosed herein.

FIGS. 4A and 4B-5 present example calculated sensor array field of view beam patterns at low, medium, and high frequencies for the array illustrated in FIG. 3.

DETAILED DESCRIPTION OF THE INVENTION

The features and functions of the invention briefly described above are now described and illustrated in detail. The illustrations provide useful information important to understanding the technical features of the directional sensor array and its adaptation as an elastic wave receiving system suitable for high-resolution reflection seismic operation. While this description places emphasis on using the directional seismic sensor array for detecting seismic SH waves because of their potential superiority in resolving small localized and elongate targets such as underground pipes, it should be understood that the same descriptive disclosure are equally applicable to the use of the seismic sensor array for detecting seismic P waves.

Figure 1A:
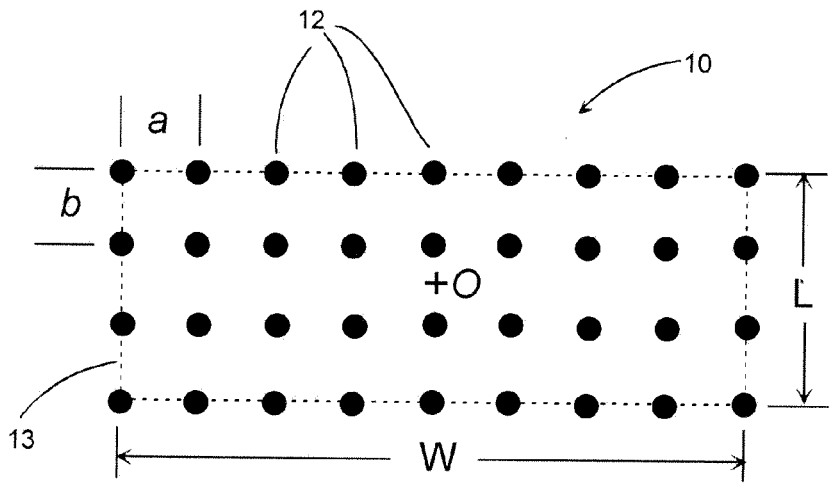
FIG. 1A illustrates a top, plan view of a planar rectangular array of 36 sensor elements uniformly distributed in rows and columns on a flat ground surface represented by the x-y plane in a Cartesian coordinate system.
Figure 1B:
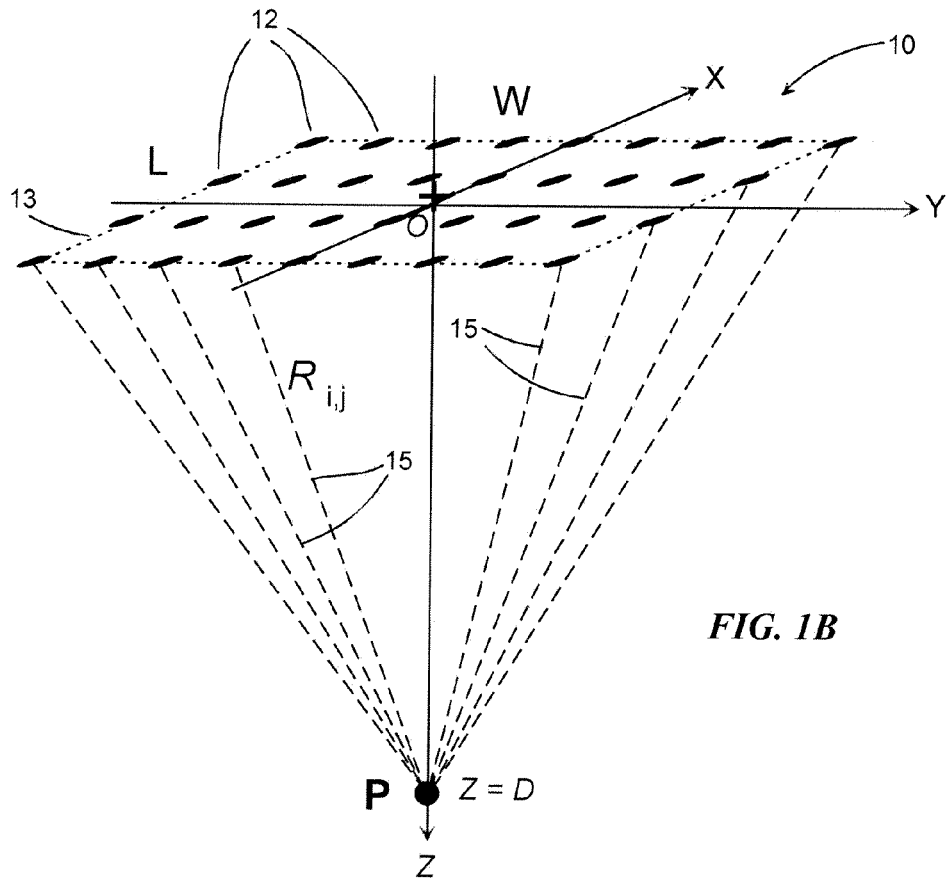
FIG. 1B shows a three-dimensional view of the array in FIG. 1A to illustrate the geometry of ray paths from a subsurface reflector point to the various sensing elements in the array.

FIG. 1A shows a plan view in the x-y plane of an example 36-element planar array 10 of ground coupling points or contacts that also serve as sensor elements 12 of a rectangular array 13 of length L and width W centered at the coordinate origin, O. In this arrangement, each sensor element is independently coupled to the ground surface by well-known techniques to detect elastic wave vibrations caused by reflections from subsurface targets. The elements are laid out in rectilinear rows and columns with uniform spacings indicated by dimension a between the columns and dimension b between the rows. FIG. 1B shows the array 10 of FIG. 1A in a three-dimensional view to illustrate a subsurface point-reflector located at point P at a depth, z=D on the z-axis, several times greater than the length, L, or width, W, of the rectangular array 13. FIG. 1B also shows the typical ray paths 15 from the reflector point to the ground contacts and sensor elements 12 of the array. While the reflector point P may be located anywhere in the medium, the directional sensor array may be primarily aimed at detecting reflections from points located only a few array dimensions away from the vertical axis through the center of the array, O, as it is scanned over the ground surface.

For the special case of a homogeneous ground medium, in which the propagation velocity of the elastic waves is constant along all paths, the ray paths 15 shown in FIG. 1B are straight lines. In the more general case, particularly for near-surface soil media, the ground medium exhibits transverse isotropy characterized by a medium having velocity of propagation that increases with depth, z. In this case, the ray paths will experience refraction effects resulting in curved rays having curvatures governed by the vertical velocity gradient in the medium and the relative positions of the reflector point P and the individual sensor elements 12. In general, for point reflector positions P located in the medium extending directly below the surface area of the sensor array, the curvatures of such refracted ray paths can be approximated by their straight-line equivalents 15, although the travel times from the reflector point to each sensor element will be dependent on the integrated average propagation velocity along each slant-path distance 15 through the non-uniform medium. In the simplest mode of operation, the outputs of each sensor element 12 in the array are added together to form the combined output of the L×W planar sensor array consisting of 36 independently detected signals.

Figure 2A:
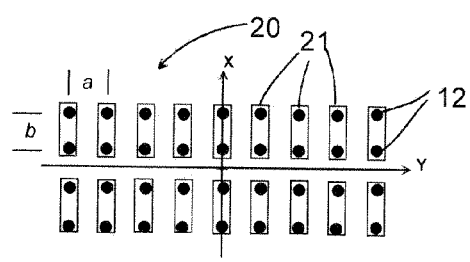
FIG. 2A through FIG. 2E show several alternative arrangements in which the sensing elements of the array may be grouped in independent sub-arrays to reduce the number of active sensors required in the array.

FIG. 2A shows the 36 sensor elements 12 of the array 10 in FIG. 1A arranged in localized groups of two elements, paired along the columns of the array, physically affixed together and further comprising a composite array 20 of 18 two-element sub-arrays 21 whose composite vibrations are equivalent to the summed combination of the individual local vibrations exciting their two ground contact elements. The vibrations combined in the two-element sub-array assemblies 21 may be detected by a single transducer physically affixed to each sub-array. Thus, instead of requiring 36 sensor transducers, the same overall array performance may be achieved using 18 bipod sensors.

Figure 2B:
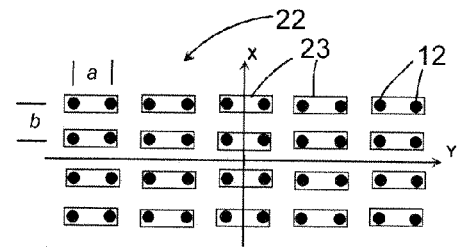
Figure 2C:
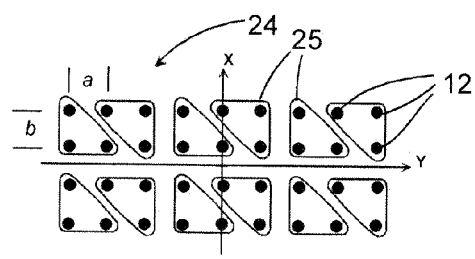
Figure 2D:
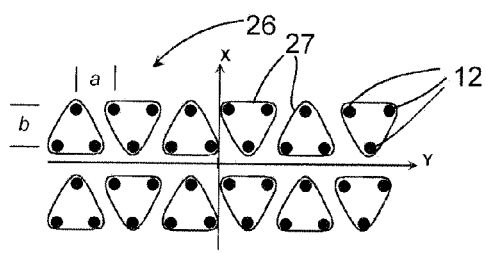
Figure 2E:
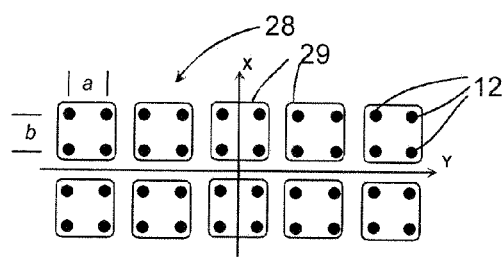

FIGS. 2B through 2E show other sub-array arrangements using localized groups of adjacent elements in the rows and columns of the array. FIG. 2B shows a bipod sub-array assembly 22, somewhat similar to array 20 in FIG. 2A but with sensor elements 12 paired as sub-arrays 23 along the rows of the array, in which the operating function is similar to that described for the pairs shown in FIG. 2A. However, to obtain an even number of elements in the rows and columns of the array 22 in FIG. 2B, the number of contact elements is increased from 36 to 40. Thus, when paired as shown, the overall array will consist of twenty bipod sub-arrays 23, each one of which will require a sensing transducer. The three-element right-triangle sub-arrays 25 shown in array assembly 24 in FIG. 2C are formed using combinations of three contacts 12 within a total of 36 sensor elements to provide a tripod-like ground contact by which the dynamic motions at the three contacts 12 are mechanically superimposed in the sub-array to produce a composite vibration sensed by a single sensor affixed to the sub-array. As shown in FIG. 2C, the 36-element sensor array 24 contains twelve right-triangle sub-arrays 25. The triangular shape of the sub-arrays shown in FIG. 2C may be changed by staggering the rows or columns of the ground contacts to obtain other tripod geometries such as isosceles or equilateral triangles, as illustrated for example by the twelve symmetrical sub-arrays 27 forming the composite array 26 shown in FIG. 2D, without changing the basic operating function of the resulting three-element sub-arrays. FIG. 2E shows yet another rectangular array assembly 28 consisting of a localized grouping of four ground contact elements 12 to form somewhat larger sub-arrays 29. In this case, the number of elements in the rows and columns must be an even number and therefore the total number of sensor elements is increased from 36 to 40. By using four-element sub-arrays 29, the 40-element array 29 requires only ten active sensors for its operation.

With reference to FIG. 1B, the elastic waves traveling along the ray paths 15 to the respective ground contacts 12, whether defined as single elements or grouped in multi-element sub-array combinations, will be received after time delays, $t_{i,j}$, associated with the ground-contact points defining the respective element positions and may be added together to form the total response of the planar sensor array 10. As a simple example, if the waveform radiated from the point reflector is a single-cycle sine wave pulse expressed as $$S_p(t) = A_p[U(t) - U(t-T)]\sin(2\pi f t) \quad (1)$$

where: f=frequency;
T=1/f=period;
$A_p$=reflection amplitude at point P; and
U(t)−U(t−T)=Heaviside gating function defining a pulse time window of one sine wave period duration,
the received pulses at the spatially distributed sensor elements are $$S_{i,j}(t) = A_{i,j}[U(t-t_{i,j}) - U(t-t_{i,j}-T)]\sin(2\pi f(t-t_{i,j})) \quad (2)$$

where: $t_{i,j} = R_{i,j}/v$=propagation time delay;
v=velocity of propagation;
$A_{i,j}$=amplitude at element i,j; i=row index; j=column index;
$R_{i,j}$=curved or slant ray path from P to array element i,j.
The amplitudes, $A_{i,j}$, of the signals at each element of the array 10 represent the diminishing effects on the reflection amplitude, $A_p$, after applying geometrical spreading of the seismic wave energy and other wave propagation losses such as attenuation and scattering that affect the reflection signal amplitude as it travels from P along each ray path 15. The net response of the rectangular array 10 of vibration detecting elements is the summation $$S_{Array}(t) = \Sigma_{i,j} A_{i,j}[U(t-t_{i,j}) - U(t-t_{i,j}-T)]\sin(2\pi f(t-t_{i,j})). \quad (3)$$

When the path lengths, $R_{i,j}$, differ by less than one half wavelength in the medium, where wavelength is defined as $\lambda = v/f$, all of the received sine wave pulses will add constructively in the summation to produce a net array response that is larger than that of any individual element in the array. For point P located anywhere in the medium, this effective array response will be attained only if the element spacings shown in FIG. 1B, are less than one-half wavelength. As a further consideration, near-field array response effects occur in the summation indicated in Equation (3) when point P is close enough to the array aperture to cause some of the extreme path lengths to the array elements to differ by more than one-half wavelength. In particular, for point P located on the z-axis, these near field effects begin to occur at a depth of $D_{NF} = W^2/2\lambda$, where W is the largest dimension of the rectangular array 10, resulting in undesirable irregularities in the array field of view at shallower depths.

The summation indicated in Equation (3), when applied to the 36-element array 10 illustrated in FIG. 1B, may be accomplished in several ways, namely, the sum may consist of: (1) thirty-six independent sensor output signals; (2) pairs of adjacent sensor output signals, either along the rows or along the columns of the array; (3) three adjacent sensor output signals, either along the rows or along the columns or as a combination of adjacent sensors in rows and columns; (4) four adjacent sensor output signals, either along the rows or along the columns or as a combination of adjacent sensors in rows and columns; and (5) in larger combinations of adjacent sensor output signals. This simple combining concept can be used to reduce the actual number of sensing transducers required in the array by grouping and replacing the indicated adjacent sensor elements by rigidly fixed sub-arrays of contact points on the ground surface and employing only one active sensor transducer to sense and produce the physically summed response of the sub-array. For example, the 36-elements shown in FIG. 1A may be grouped in three's, as shown in FIG. 2C, by rigidly fixing the three ground-contact points to a small sub-array mounting plate to reduce the number of active sensor transducers required in the array by a factor of three.

Sub-arrays having four or more contact points on the ground may potentially make imperfect or incomplete contact on rough or uneven ground surfaces which, in many cases, may also include practical paved surfaces. However, two-point and three-point sub-arrays will always conform to rough surfaces and, to good advantage, three-point sub-arrays using a tripod arrangement of row and column elements will make more stable conformal contact than two-element bipod sub-arrays and will operate with one-third as many sensor transducers as needed in the full array. Therefore, three-element sub-arrays are preferred over two-element or four-element sub-arrays.

The discussion above and the associated sensor array patterns presented in FIG. 4B-1 thru FIG. 4B-5 refer to arrays having rectangular contact areas on the ground surface. This contact area is the "receiving aperture" of the array and, as discussed, its dimensions may be expressed in terms of the wavelength, $\lambda$, of seismic waves in the ground medium at the operating frequency of interest. At the lowest operating frequency (largest operating wavelength), the aperture length and width dimensions of the array will be less than one wavelength, typically as small as about $\lambda/4$. At the highest operating frequency (smallest operating wavelength), the aperture dimensions may be as large as about $6\lambda$ to $8\lambda$; an effective aperture range of about 1 to 30 over the frequency range of interest. The general frequency range of interest for the applications intended in this disclosed invention is 100-1,600 Hz for which the longest wavelength is 90 in. and the shortest wavelength is 5.63 in. for shear waves in soil media having a typical propagation velocity of about 750 ft/sec.

The receiving beam pattern examples shown in FIG. 4B-1 thru FIG. 4B-5, calculated for an array having dimensions L=21.0 in. by W=40.5 in., illustrate the fact that the array field of view is approximately inversely proportional to frequency. In general, array apertures smaller than about one wavelength in the largest dimension have a relatively wide field of view whereas apertures having dimensions larger than one or two wavelengths have a relatively narrow field of view. The relative receiving sensitivity or energy gathering ability, often referred to as the "array gain", of such planar arrays is proportional to the aperture area, expressed in square wavelengths. For this reason, a given physical size array will exhibit a greater array gain at higher frequencies than at lower frequencies. Therefore, to good advantage in many applications, sensor arrays having dimensions comparable to and larger than the operating wavelengths of interest will exhibit a greater array gain and a more narrow field of view than smaller arrays.

Figure 3:
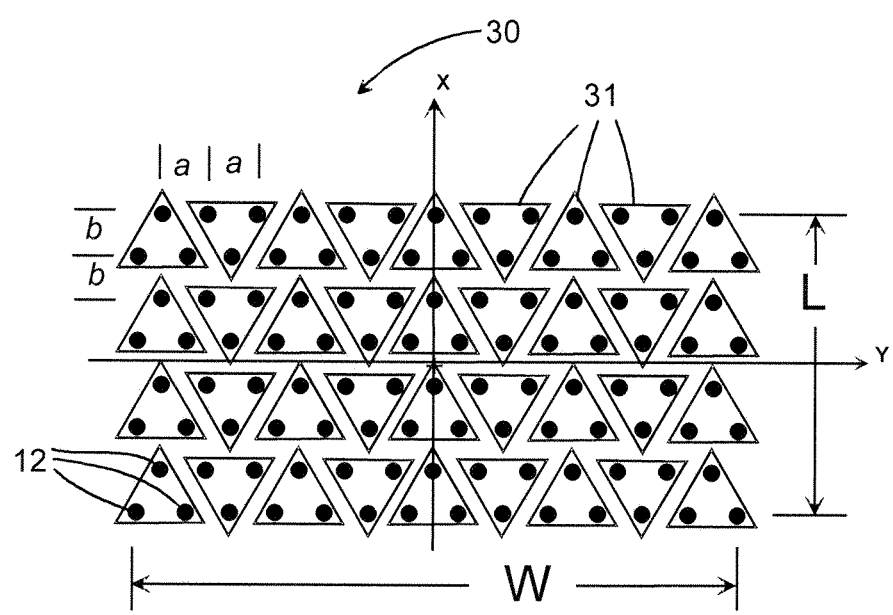
FIG. 3 shows a rectangular array consisting of 36 triangular sub-arrays to illustrate relative orientations of the sub-arrays within the rectangular layout of the array.

FIG. 3 shows an alternative sub-array arrangement 30 consisting of 36 symmetrical isosceles tripod sub-arrays 31 to provide a total of 108 ground-contact points 12 having row and column spacings of a=3.0 in. and b=3.0 in., respectively. In FIG. 3, the overall dimensions of the ground-contact array area is L=21 in. and W=40.5 in. A staggered shift of the second, fourth, sixth, and eighth rows of ground contact points 12 in the array is required to achieve the symmetrical isosceles contact geometry. This staggered positioning introduces an azimuthal skewing of the directional beam pattern, as discussed below, but the effect is generally small enough to avoid significant distortion of the principal downward-directed receiving beam of the array. The layout of the sub-arrays 31 in FIG. 3 illustrates how the triangular sub-arrays nest together to allow a spacing of 1.5a between the geometrical centers of the sub-arrays along the rows and a spacing of 2b along the columns, i.e., between the rows of the array. This tripod layout represents a generally optimum placement of the sub-arrays 31 within the overall array dimensions. Given this layout, a number of variations related to the sub-arrays can be applied to introduce changes in the overall array response. Examples of such changes include: (1) changing the orientation of the SH-wave sensing transducer mounted on each sub-array by 90 degrees to shift the optimal SH-wave response direction from the x-axis to the y-axis; (2) mounting two SH-wave sensing transducers on each sub-array 31 thereby expanding the array 30 to a biaxial system capable of responding to SH waves having any azimuthal polarization in the x-y plane; and (3) mounting a triaxial sensor on each sub-array thereby allowing the array to simultaneously receive SH waves an P waves at each location on the ground surface.

FIG. 4A presents a calculated example of the SH-wave field-of-view pattern at a single ground contact point. As a single-point pattern, this field of view is independent of frequency. The pattern in FIG. 4A is shown in half-cut-away form and normalized to unit amplitude for purposes of illustration. The complete pattern has a semicircular torroidal shape in the xz-plane. All SH-wave particle motions at any point on the pattern are parallel to the y-axis. FIGS. 4B-1 through 4B-5 present calculated examples of SH-wave beam patterns normalized to unit amplitude for the array 30 depicted in FIG. 3 described above. The calculated patterns illustrate the 36-tripod sensor array directional field of view for horizontally polarized shear (SH) waves at approximate octave frequencies of 100, 220, 460, 820, and 1,540 Hz. For these example patterns, the SH wave propagation velocity in the medium is 750 ft/sec, typical of firm naturally occurring or stabilized backfill soils. The wavelengths corresponding to the indicated frequencies are 90 in., 41 in., 19.6 in., 11.0 in., and 5.8 in., respectively. The depth used in the calculated patterns is D=18 ft. The pattern at 100 Hz shown in FIG. 4B-1, where W is small (0.28λ), illustrates a torroidal spatial field of view similar to that of the single-point SH sensor element shown in FIG. 4A. The patterns at 460 Hz and higher, shown in FIGS. 4B-3 through 4B-5, exhibit increasing directivity and correspondingly higher array gain with increasing frequency. The half-power field of view in the various patterns shown in FIGS. 4B-1 thru 4B-5 is defined by an oval cross-sectional area normal to the z-axis at 70.7 percent of the on-axis beam response. The oval beam area at each operating frequency is characterized by the x- and y-plane half-power beamwidth (BW) angles in the orthogonal planes. These beamwidths are tabulated in Table 1 below for the plots in FIGS. 4A and 4B-1 thru 4B-5. The array gain is defined as the half-power cross-sectional area of the singe-point sensor pattern used as the gain reference divided by the half-power cross-sectional area of the overall L×W sensor array.

The sensor array 30 receiving beam patterns shown in FIG. 4B illustrate well-defined downward-oriented fields of view over the frequency range 100-1,540 Hz. In this regard, at frequencies of about 400 Hz and higher, the receiving beam has the approximate form of a "pencil beam" such as that associated with a uniformly illuminated two-dimensional aperture. In this upper frequency range, the beam sidelobes shown in FIG. 4B are generally in the range of about −17 dB to −20 dB below the maximum vertical-axis response. However, as shown in FIGS. 4B-1 thru 4B-5 the side lobes are noticeably asymmetrical about the vertical axis because of the staggered shift in the ground contact points in alternate rows of the array layout 30 shown in FIG. 3. A further effect of staggered spacings of the rows of ground contacts is a noticeable angular skewing of the directional field of view as evidenced mainly in the xy-plane.

TABLE 1

| FIG. No. | Frequency (Hz) | $BW_{yz}$ (deg) | $BW_{xz}$ (deg) | $BW_{xy}$ (deg) |
|---|---|---|---|---|
| 4A | All frequencies | 90 | Omnidirectional | 90 |
| 4B-1 | 100 | 70 | Omnidirectional | — |
| 4B-2 | 220 | 44 | 98 | — |
| 4B-3 | 460 | 22 | 41.9 | — |
| 4B-4 | 820 | 12 | 22 | — |
| 4B-5 | 1540 | 5.9 | 11.8 | — |

Figure 4C:
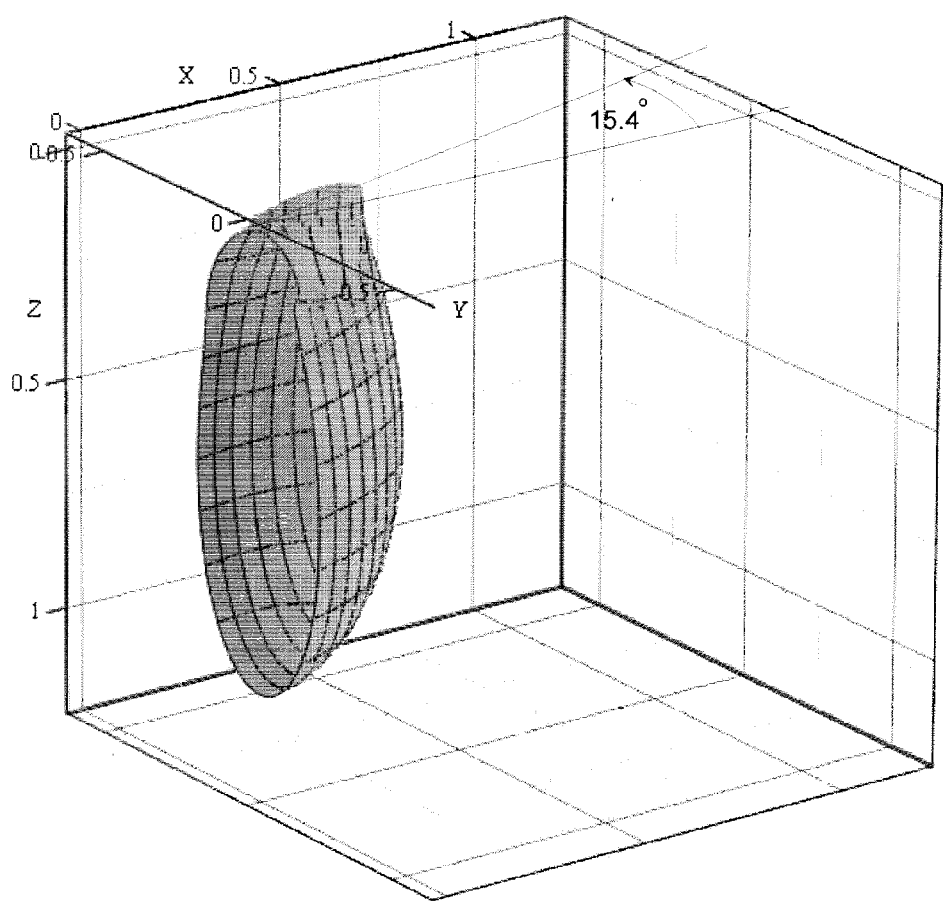
FIG. 4C shows the angular skew effect in the field of view associated with the sensor array illustrated in FIG. 3.

FIG. 4C shows the pattern calculated at 340 Hz to illustrate this skewing effect in sensor array 30 more clearly than in the other patterns shown in FIGS. 4B-1 thru 4B-5. Specifically, the skew angle in this case is 15.4 degrees counter-clockwise as measured and indicated in the plot in FIG. 4C. Other calculated beams at 340 Hz for different values of the ratio b/a in the range 1<b/a<2 show that the skew angle decreases approximately linearly with b/a, specifically yielding a skew angle of 7.2 degrees counter-clockwise for b/a=1 when a=3 in.

Figure 5A:
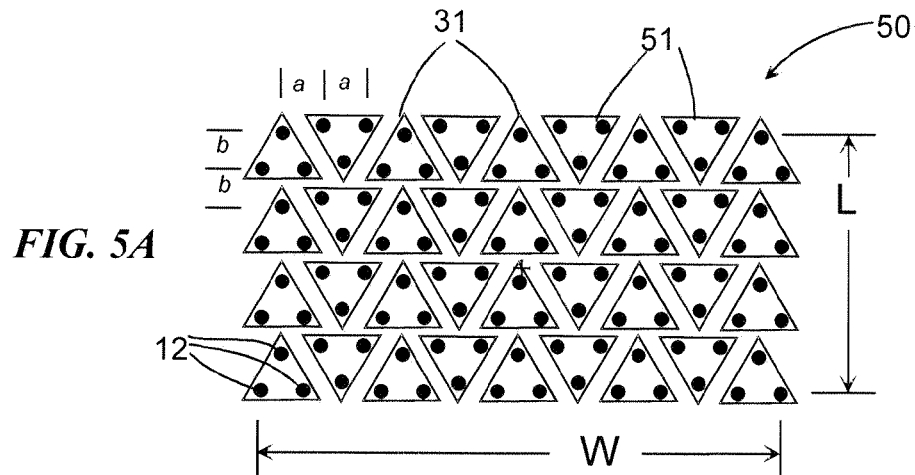
FIG. 5A through FIG. 5C show methods for modifying the sensor array illustrated in FIG. 3 to correct the angular skew effect in the sensor array field of view.
Figure 5B:
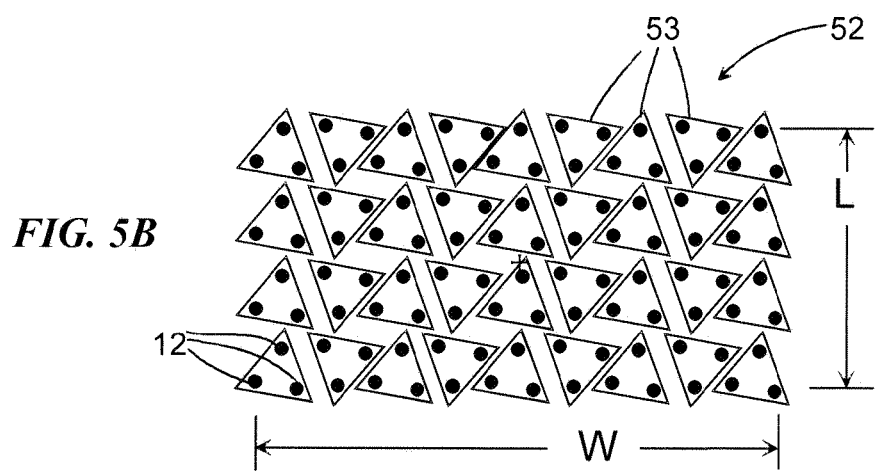
Figure 5C:
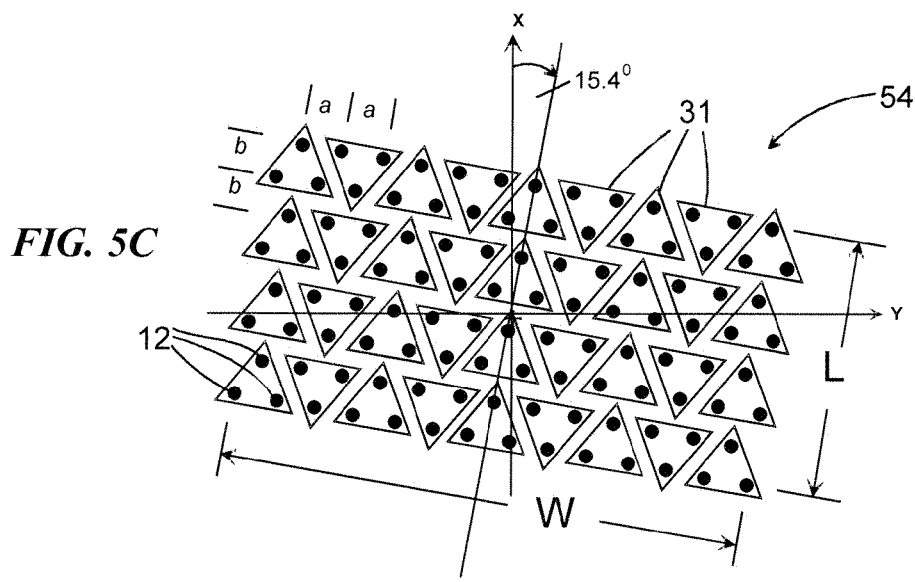

One possible method for correcting this angular skewing effect, shown, for example, in FIG. 4C, associated with the isosceles triangle sub-array assembly 30 in FIG. 3, is shown in sensor array 50 in FIG. 5A wherein staggered shifts are introduced in alternate columns of the tripod sub-arrays 51 relative to the un-shifted columns 31. A second possible method for correcting this counter-clockwise angular skewing effect is shown in sensor array 52 in FIG. 5B wherein each tripod sub-array 53 is rotated clockwise about its geometrical center. A third possible method for adjusting the angular skewed receiving beam in FIG. 4C to align with the x-axis is shown in sensor array 54 in FIG. 5C. In this arrangement, the sensor array 54 is rotated clockwise by the skew angle shown in FIG. 4C. Finally, the angular skewing effect associated with the sub-array shown in FIG. 3 can be eliminated by avoiding the staggered shift in the ground contact rows and columns. This requires that the sub-arrays be either right triangle tripods as shown in FIG. 2C or bipod sub-arrays as shown in FIG. 2A or FIG. 2B. In this latter case, the advantage provided by the right triangle tripod sub-array in eliminating the beam skewing effect is supplemented by the added advantage that the right triangle sub-array mounting plate is also the preferred geometry when two SH-wave accelerometer sensors are to be used to make the overall array a biaxial SH-wave sensor array system. Furthermore, the right triangle mounting plate will also accommodate a third accelerometer to give the sub-arrays a triaxial response for simultaneously detecting SH waves and P waves.

The sensor receiving beam patterns shown in FIG. 4B are calculated for a propagation medium having a representative viscoelastic attenuation rate of 1 dB per wavelength, typical of absorption conditions in firm natural soils and engineered soils such as road beds and in bedded pipeline trenches. The attenuation expressed in decibels is inversely proportional to wavelength and, hence, directly proportional to frequency. The values of attenuation loss for the depth of 18 ft used in the pattern calculations in FIGS. 4B-1 thru 4B-5 are tabulated in Table 2 below together with the sensor array gain expressed in decibels for the example sensor array 30 in FIG. 3. Comparison of these values indicates that the sensor array gain compensates for the attenuation in the medium with reasonable accuracy at frequencies up to about 800 Hz and provides significant partial compensation at frequencies in the next octave above 800 Hz. This result is an important functional feature of the directional sensor array in that viscoelastic attenuation is the major limitation of propagation distance at the short wavelengths necessary for detecting small underground targets. Furthermore, some near-surface soils can potentially have viscoelastic attenuation rates greater than the typical value of 1 dB per wavelength used in these calculations. Therefore, to boost compensation, the sensor array gain may be increased, within

TABLE 2

| | Frequency (Hz) | Attenuation (dB) | Array Gain (dB) | Compensation (dB) |
|---|---|---|---|---|
| 4B-1 | 100 | −2.4 | 4.1 | 1.7 |
| 4B-2 | 220 | −5.3 | 5.3 | 0 |
| 4B-3 | 460 | −11 | 12 | 1 |
| 4B-4 | 820 | −19.7 | 17.4 | −2.3 |
| 4B-5 | 1540 | −37 | 23.2 | −13.8 | limits, at the higher frequencies by increasing the area of the L×W aperture of the sensor array 30 by adding more sub-array elements. Limitations will occur when near-field diffraction effects associated with large aperture arrays cause undesirable distortion of the beam pattern when operating to detect shallow targets.

Figure 6A:
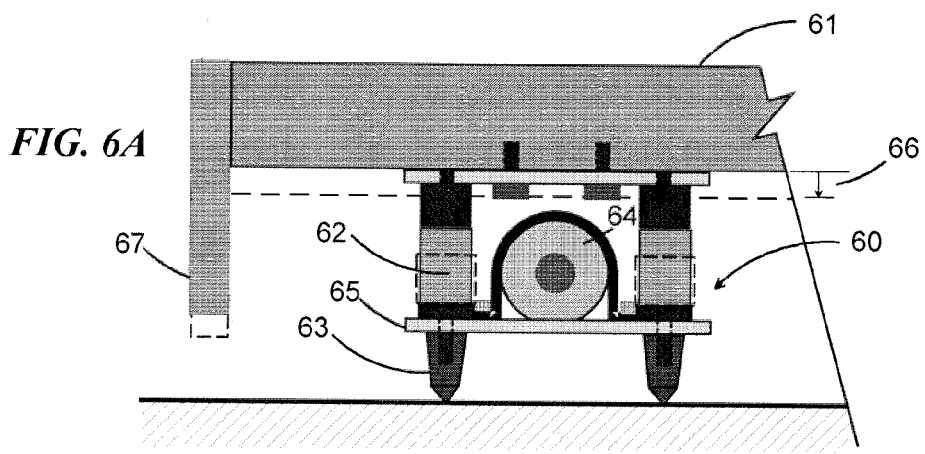
FIG. 6A shows a side elevation view of a three-element sub-array illustrating the sub-element base plate, the ground contacting points, and the compliant mounting columns by which the sub-array is mounted on a steel hold-down plate.
Figure 6B:
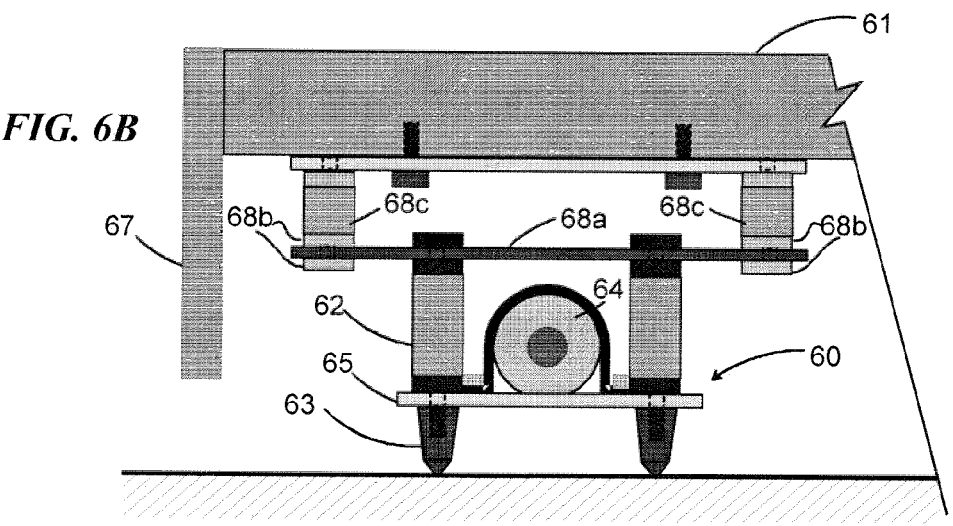
FIG. 6B shows a side elevation view of an alternate compliant suspension arrangement for supporting the individual sub-arrays to reduce cross-coupled vibrations between the sub-array elements of the sensor array.
Figure 6C:
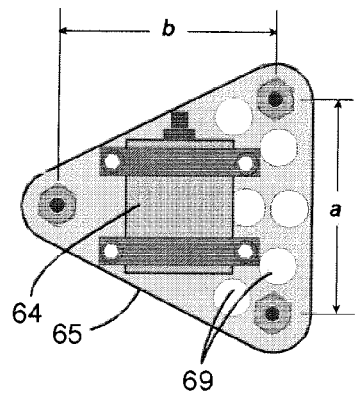
FIG. 6C shows a top plan view of the three-element sub-array of FIG. 6A indicating the locations of the collinear ground contact points and compliant mounting columns and the placement of the accelerometer sensor at the center of mass of the sub-array.

FIG. 6A the shows a side elevation view of a tripod sub-array 60 assembly configured to function as part of a larger overall L×W sensor array such as the array 30 illustrated in FIG. 3. The tripod sub-arrays are mounted on the underside of a steel hold-down plate 61 and are isolated from the hold-down plate by high-compliance columns 62 located collinear with the ground contact points 63, typically made of stainless steel, at the corners of the tripod plate 65. The single tripod sensing transducer 64, in this case a seismic-grade accelerometer, is rigidly mounted on the triangular sub-array plate 65 with its axis oriented horizontally for detecting SH waves. The tripod assembly 60 may be mounted on the hold-down plate 61 so as to allow detection of SH waves having shear particle motions either parallel to the width dimension, W, or parallel to the length dimension, L, of the array assembly 60. Also shown in FIG. 6A are the ground contact points 63 and the compliant columns 62, the latter typically made of relatively soft polymeric material, for example low-durometer urethane rubber, with threaded anchor studs or sockets molded into the ends, mounted collinear with the contact points. The compliant columns 62 allow the individual tripod sub-arrays to adaptively contact the ground surface with uniform force and also provide the important function of isolating the detected vibrations in each sub-array from one another via the common path through the steel hold-down plate. The dotted lines in FIG. 6A show, with exaggeration, the displacement 66 that occurs when the complete array assembly consisting of the hold-down plate and the 36 sub-arrays is placed in contact with the ground. Steel side panels 67 provide part of the hold-down mass and serve as side barriers to protect the sub-arrays. When the sub-array is mounted on the hold-down plate, the compliant mounting columns 62 tend to uniformly distribute the weight of the hold-down plate on the tripod assemblies when the contact points rest on and mechanically couple to the ground surface. The compliant columns 62 also isolate the sub-arrays 60 from one another to provide separate and independent responses to vibrations at their tripod ground contacts The hold-down weight distributed on the tripod sub-array assemblies 60 is the minimum amount required to ensure reliable coupling to the ground surface, typically 1-2 lb at each tripod assembly, and to ensure that the vertical and horizontal spring-mass resonance frequencies of the hold-down plate 61 and combined compliance of the rubber mounting columns 62 on the tripod sub-assemblies 60 are substantially below the lowest intended operating frequency of the seismic sensing array. FIG. 6B shows a modification of the sub-array mounting assembly in FIG. 6A illustrating an alternate compliant suspension of the sub-array 60 attached to the steel hold-down plate 61. In this arrangement, a second stage of flexural support, in addition to the compliant columns 62, is provided by a membrane 68a, preferably made of low-durometer urethane rubber, to which the compliant columns 62 are attached. The compliant membrane 68a is mounted in a triangular frame 68b and is stretched in slight two-dimensional tension to provide reproducible positioning and uniform support of the sub-array assembly 60 when placed in contact with the ground. The membrane mounting frame 68b is attached to the underside of the steel hold-down plate 61 by three stand-off columns 68c made of either metal or compliant rubber material. The alternate compliant membrane and compliant column suspension shown in FIG. 6B has the important purpose of providing additional isolation between each sub-array 60 by reducing or preventing the individually detected vibrations at each sub-array from being transmitted to other sub-arrays via the steel hold-down plate, causing unwanted cross-coupled interference between the sub-arrays. FIG. 6C shows a plan view of the triangular mounting plate 65 with weight-reducing holes 69 to minimize the inertial mass of the ground coupling assembly. The preferred material for this plate is magnesium alloy, with aluminum alloy as the next choice.

Figure 7:
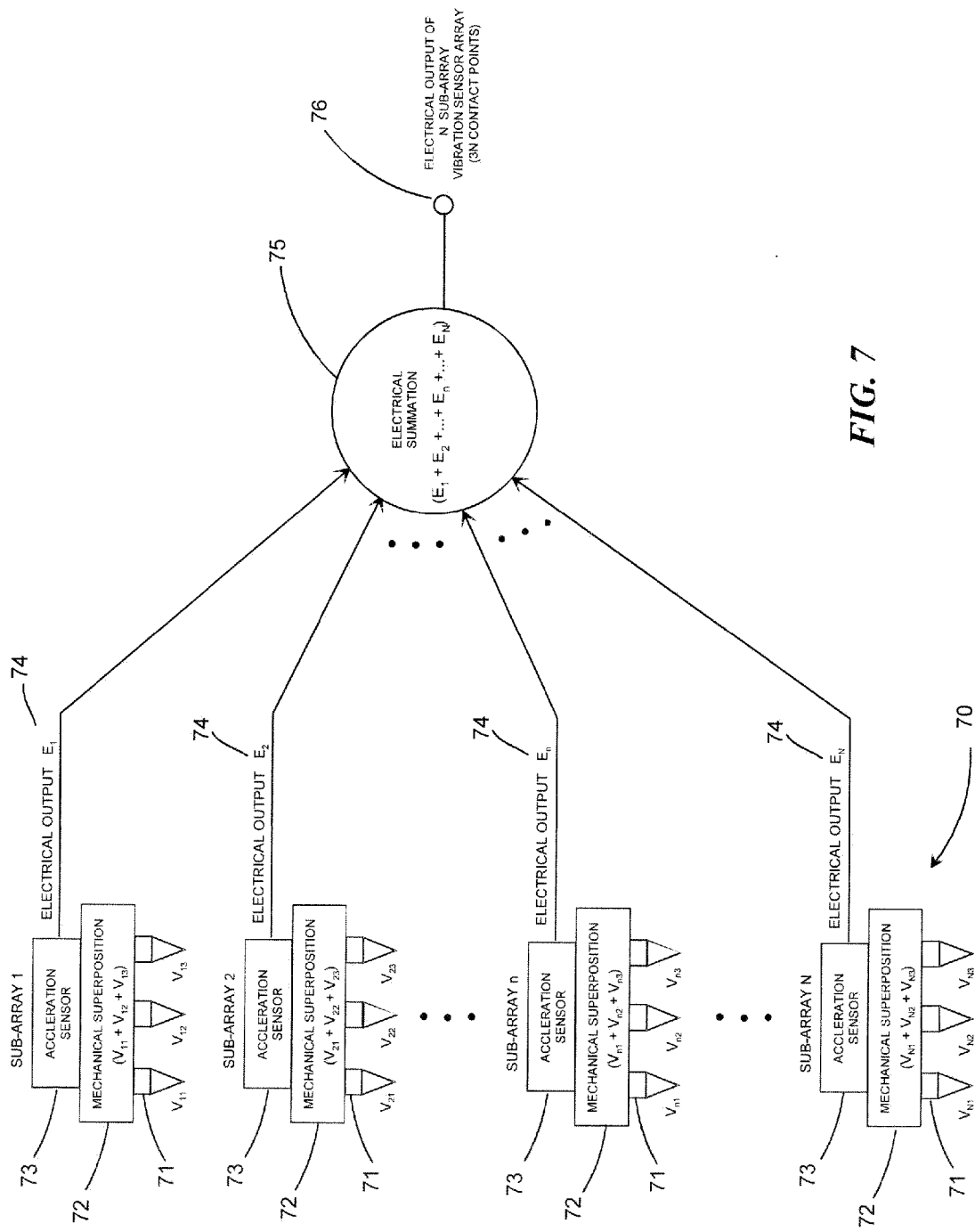
FIG. 7 shows a simplified diagram of the mechanical and electrical summations of vibration signals and electrical signals representing the response of an overall vibration sensor array.

With reference to Equation (3), operation of the overall sensor array is achieved by summing the ground vibrations exciting each ground contact element to accomplish the directional sensor array response. As described and illustrated in the foregoing discussions, the summation process occurs, in part, by mechanical superposition of the vibrations at closely spaced ground contacts rigidly affixed to small sub-array mounting plates. The combined vibrations are thereupon sensed by a single accelerometer also rigidly affixed to the mounting plate. The sensing axis of the accelerometer is oriented to detect the preferred seismic wave particle motions at the ground contact elements. The accelerometer generates an electrical output signal representing the sum of the three vibration signals at the sub-array ground contacts. Thus, in this example, the mechanical superposition is the effective summation of the vibrations at the three ground contacts followed by conversion of this sum to an electrical signal proportional to the composite particle motion acceleration of the sub-array. The electrical output signals from the accelerometers are then summed electrically to produce the directional sensor array output signal. FIG. 7 illustrates this overall summation process, depicting N sub-arrays 70, each one having three ground contact elements 71 and a single acceleration sensor 73 mounted on the base plate 72. The output signals 74 from the N accelerometers 73 are superimposed in an electrical summing circuit 75 to produce the final output signal 76. As a result, this sensor array with N three-element sub-arrays allows the overall ground-contact array system to consist of 3N vibration ground-contact elements. For the example used in the foregoing description of the invention, the overall sensor array containing N=36 sub-arrays arranged in four rows and nine columns has 3N=108 ground-contact elements.

An extended operating mode of the sub-array signal summation process illustrated in FIG. 7 is one in which the sub-array electrical output signals 74 are each subjected to a predetermined time adjustment prior to summation in the electrical summing circuit 75 for the purpose of focusing the sensor array response to emphasize detecting targets located at a specific depth below the ground surface. Such a focused array response is achieved when the reflected seismic wavelets being summed as indicated in Equation (3) are adjusted to occur simultaneously in time. Specifically, these time adjustments are small time shifts, $\Delta t_{i,j}$, applied to the $t_{i,j}$ terms in Equation (3) to obtain approximate in-phase summation of all of the sub-array output signals. Specifying the time shifts, $\Delta t_{i,j}$, requires knowledge of the mean velocity of propagation in the medium and the location of the reflection point, P, relative to the sensor array as previously shown in FIG. 1B. However, since the source-sensor array pair is essentially limited to near-vertical seismic soundings by its bounded field of view, point P can be assumed to be located on the vertical axis directly below the effective center of the source-sensor pair, reducing the location of point P only to the target depth, D. Thus, with knowledge of the mean propagation velocity or by using an estimated value of that velocity, the time shifts, $\Delta t_{i,j}$, required in each sub-array signal are predictable for a given depth, z=D, and sensor array geometry. That is, using the travel time, $t_{DO}$, from depth, D, to the origin, O, of the sensor array as reference, the time shifts associated with each sub-array signal are $$\Delta t_{i,j} = t_{DO} - t_{i,j} = t_{DO} - \frac{R_{i,j}}{v_s} \quad (4)$$

which are negative or zero when the point P is on the vertical axis through the origin of the sensor array. Therefore, by shifting each of the sub-array time series signals by their respective increments, $\Delta t_{i,j}$, before summation, the sensor array will be fixed in focus to provide real-time "on-line" focused detection of targets at depth, D, below the surface. A similar but more elaborate method of operation is one in which the sub-array signals are separately recorded as time-series traces prior to summation and, later, processed off-line for focused array operation. In this case, the time shifts in Equation (4) can be derived for different depths to allow the recorded signal traces to be focused at various depths for more detailed reflection analysis at each source-sensor sounding point. This multi-channel signal recording method may also be used in a more generalized way when reflected signals are recognized or otherwise suspected to be present in the records. In this case, the recorded signals are analyzed to determine the time shifts between each sub-array target reflection arrival time and the target arrival time for the central sub-array in the overall sensor array. These experimentally derived time shifts are then applied to the respective sub-array signal traces prior to summation to maximize the summed output result. With this latter method, no specific knowledge of the propagation velocity or depth of the reflecting target is required to achieve focused operation of the sensor array.

The vibration sensor array system described herein discloses that the individual sub-arrays may be modified to allow changes in the number of the ground contact points; changes in the positions of contact on the solid medium; changes in the number, style, and compliance parameter of the compliant suspension columns or other compliant members used to mount the sub-array assemblies to the steel hold-down plate; changes in the mounting of the single vibration sensor to orient its sensitive axis for preferentially detecting horizontally polarized shear waves or compressional waves; to allow other physical changes in the sub-arrays such as staggering rows or columns of sub-arrays and rotating sub-arrays for purposes of improving or optimizing the operating performance of the sensor array system; and introducing time shifts in the sub-array output signals to provide focused response of the sensor array system for detecting reflector targets located at specific depths for use in various near-surface seismic survey applications.

The foregoing descriptions refer to specific sensor arrays and sub-arrays to clearly communicate the concepts of the invention. These examples, stated dimensions, and preferred materials are selected to allow accurate calculations of typical sensor array beam patterns and to describe and illustrate typical assembly features and, as such, they are not intended to be construed in a limiting sense. On the contrary, various modifications of the disclosed embodiments will become apparent to those skilled in the art upon reference to the description of the invention. It is therefore contemplated that the appended claims will cover any and all such modifications, alternatives, and equivalents that fall within the true spirit and scope of the invention.

The invention claimed is:

1. A vibration sensor array system having sub-array vibration sensing assemblies in uninterrupted contact with a solid medium for detecting horizontally polarized seismic shear wave or compressional wave dynamic motions in said solid medium and converting said detected dynamic motions to electrical signals corresponding to said dynamic motions, comprising:

two or more said sub-array assemblies in contact with a two-dimensional area of the surface of said solid medium, each of said sub-array assemblies comprising:
a rigid subassembly base plate;
one or more vibration sensors mounted on said rigid subassembly base plate, said rigid subassembly base plate having mounted on an underside and in contact with said solid medium at least two rigid contact point elements communicating mechanical signals imparted by said dynamic motions in said solid medium to vibrations in said rigid subassembly base plate, said base plate vibrations detected and converted to electrical signals by said one or more vibration sensors, said rigid subassembly base plate having at least two compliant mounting columns attached to an upper side for mounting said rigid subassembly base plate to an underside of a hold-down plate distributing hold-down mass to each said at least two sub-array assemblies for uninterrupted contact with said solid medium; and
a means for conditioning and combining said electrical output signals from said at least two sub-array assemblies to form a complete composite electrical output signal of said vibration sensor array system.

2. The vibration sensor array system of claim 1, wherein said dynamic motions are caused by horizontally polarized shear waves or compressional waves, said shear waves having particle motions parallel or nearly parallel to the surface of said solid medium and said compressional waves having particle motions perpendicular or nearly perpendicular to surface of said solid medium.

3. The vibration sensor array system of claim 1, wherein said one or more vibration sensors are mounted on said sub-array assemblies with sensitive axis oriented either horizontally for detecting said shear waves or vertically for detecting said compressional waves or in both horizontal and vertical orientations for simultaneously detecting said shear and said compressional waves at said surface of said solid medium.

4. The vibration sensor array system of claim 1, wherein said dynamic motions at said surface of said solid medium are horizontally polarized shear seismic waves or compressional seismic waves originating from up-going, near-vertical, reflections from subsurface targets or up-going, near-vertical, transmissions from a subsurface seismic wave source.

5. The vibration sensor array system of claim 1, wherein said two-dimensional area of contact on said surface of said solid medium is approximately equal to or greater than the seismic shear wavelength or approximately equal to or greater than the seismic compressional wavelength in said solid medium, said dimensions defining the aperture and directional field of view of said vibration sensing array system.

6. The vibration sensor array system of claim 1, wherein said compliant mounting columns of said sub-array assemblies are attached to a second compliant member, said second compliant member on a frame attached to said under side of said hold-down plate.

7. The vibration sensor array system of claim 1, wherein said contact point elements mounted on said sub-array assemblies are positioned within said two-dimensional area of contact of the surface of said solid medium, said positions spaced apart by a distance of one-half wavelength or less of said seismic shear waves in said solid medium at the highest operating frequency of interest.

8. The vibration sensor array system of claim 1, wherein said contact point elements mounted on said sub-array assemblies are positioned within said two-dimensional area of contact of the surface of said solid medium, said positions spaced apart by a distance of one-half wavelength or less of said seismic compressional waves in said solid medium at the highest operating frequency of interest.

9. The vibration sensor array system of claim 1, wherein said sub-array assemblies are adjustable in relative positions by rotation about their geometrical centers to correct for distortion in the directional field of view of said vibration sensor array system.

10. The vibration sensor array system of claim 1, wherein said compliant mounting columns of said sub-array assemblies isolate said detected vibrations from said hold-down plate and adjacent said sub-array assemblies.

* * * * *